United States Patent
Mastrocola

Patent Number: 5,976,583
Date of Patent: Nov. 2, 1999

[54] APPARATUS AND METHOD FOR PROTECTING WINE AGING IN CASKS FROM EXPOSURE TO AIR

[76] Inventor: Edward P. Mastrocola, 19 Belmont Park, Everett, Mass. 02149

[21] Appl. No.: 09/104,029

[22] Filed: Jun. 24, 1998

[51] Int. Cl.⁶ .................. C12G 1/00; B65B 1/04
[52] U.S. Cl. .................. 426/7; 426/11; 426/15; 426/392; 141/382
[58] Field of Search .................. 49/277, 277.1, 49/275; 426/7.15, 11, 392, 395; 141/382

[56] References Cited

U.S. PATENT DOCUMENTS

| | | | |
|---|---|---|---|
| 276,083 | 4/1883 | Schunck. | |
| 2,181,839 | 11/1939 | Tressler | 99/35 |
| 3,083,098 | 3/1963 | Sullivan | 99/48 |
| 3,958,721 | 5/1976 | Kushida et al. | 222/107 |
| 4,211,115 | 7/1980 | Engebreth | 73/421 B |
| 5,634,505 | 6/1997 | Wong | 141/349 |

Primary Examiner—David Lacey
Assistant Examiner—Drew Becker
Attorney, Agent, or Firm—William Nitkin

[57] ABSTRACT

An apparatus for protecting wine aging in one or more cask containers from exposure to air caused by depletion of wine in such casks by providing a reservoir of wine in a flexible bag suspended above the cask(s) with a tube(s) directing such wine through an aperture in the bung(s) of the top bunghole(s) of the cask(s) to maintain the cask(s) in a full state while the wine ages therein.

2 Claims, 2 Drawing Sheets

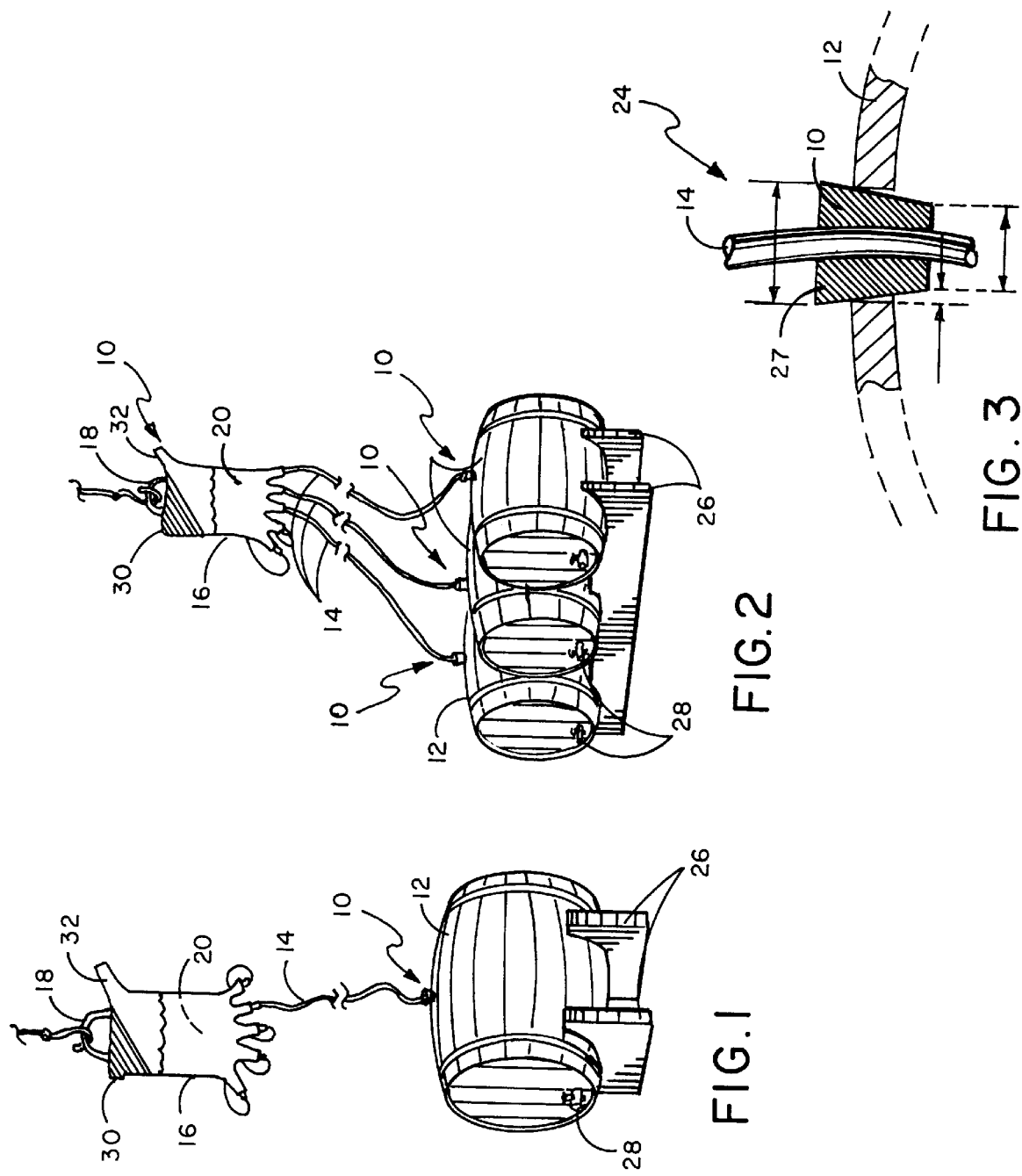

US 5,976,583

APPARATUS AND METHOD FOR PROTECTING WINE AGING IN CASKS FROM EXPOSURE TO AIR

BACKGROUND OF THE INVENTION

1. Field of the Invention

The present invention resides in the field of containers for aging wine and more particularly relates to an apparatus and method for maintaining such containers in a full state, thereby protecting the wine from harmful oxidation.

2. Description of the Prior Art

Oxidation of wine during its aging process can affect its taste, color, composition, and quality. Prevention of oxidation and spoilage, which results from prolonged air contact, are of prime concern during the wine-aging process. In that process, wine can be lost due to contraction of the wood in wooden barrels causing seepage of the wine between the staves and resulting in air pockets forming above the top surface of the wine. It is a common practice in the prior art to reduce air exposure during the aging process by manually adding wine to top off the wine containers, barrels, casks, or vessels. This manual topping-off process is time-consuming as it requires a person to remove the bung from the bung hole of each wine barrel and check the wine level and, if needed, add wine to each barrel.

Other methods for reducing oxidation include introducing nitrogen or carbon dioxide gas into the head space above the wine, as taught in Jandrich U.S. Pat. No. 4,517,884, but this method does not work with containers having porous walls, such as wood barrels. Some inventions provide for an inflatable bladder which fits inside the wine barrel. When the wine level subsides, water or air from a reservoir flows, or is pumped, into the bladder, raising the level of the wine and reducing the presence of trapped air above the wine. Examples of such inventions are Engebreth U.S. Pat. No. 4,211,115 and Sullivan U.S. Pat. No. 3,083,098.

SUMMARY OF THE INVENTION

The present invention discloses an apparatus and method for maintaining a peak level of wine aging in a container, barrel, or cask to prevent oxidation of the wine. A tube running through the bung of a barrel containing aging wine is connected to a wine reservoir suspended thereabove. By force of gravity, wine flows from the reservoir, through the tube, and into the barrel to replace instantaneously and automatically any wine that is escaping from the barrel. A single reservoir can supply wine to one or more barrels by use, respectively, of one or more tubes passing through apertures in the bungs of the respective barrels.

It is an object of this invention to provide an apparatus and method for maintaining a filled level of wine in a wine container to prevent oxidation that results from exposure of the wine to any pocket of air that develops above such level of wine in the container.

It is a further object of this invention to reduce labor costs involved in the wine aging process by eliminating the need for manually topping off wine containers.

It is still a further object of this invention to provide a wine container filling apparatus that can be easily retrofitted to existing containers used in the wine aging process.

BRIEF DESCRIPTION OF THE DRAWINGS

FIG. 1 illustrates a front perspective view of the apparatus of this invention suspended above and connected to a container for aging wine.

FIG. 2 illustrates a front perspective view of the apparatus of this invention being used simultaneously with a plurality of wine containers during the wine aging process.

FIG. 3 illustrates an enlarged cross-sectional view of the attachment of the tube of this invention passing inside the wine container through the bung of the wine container.

DESCRIPTION OF THE PREFERRED EMBODIMENT(S)

Figure 4:
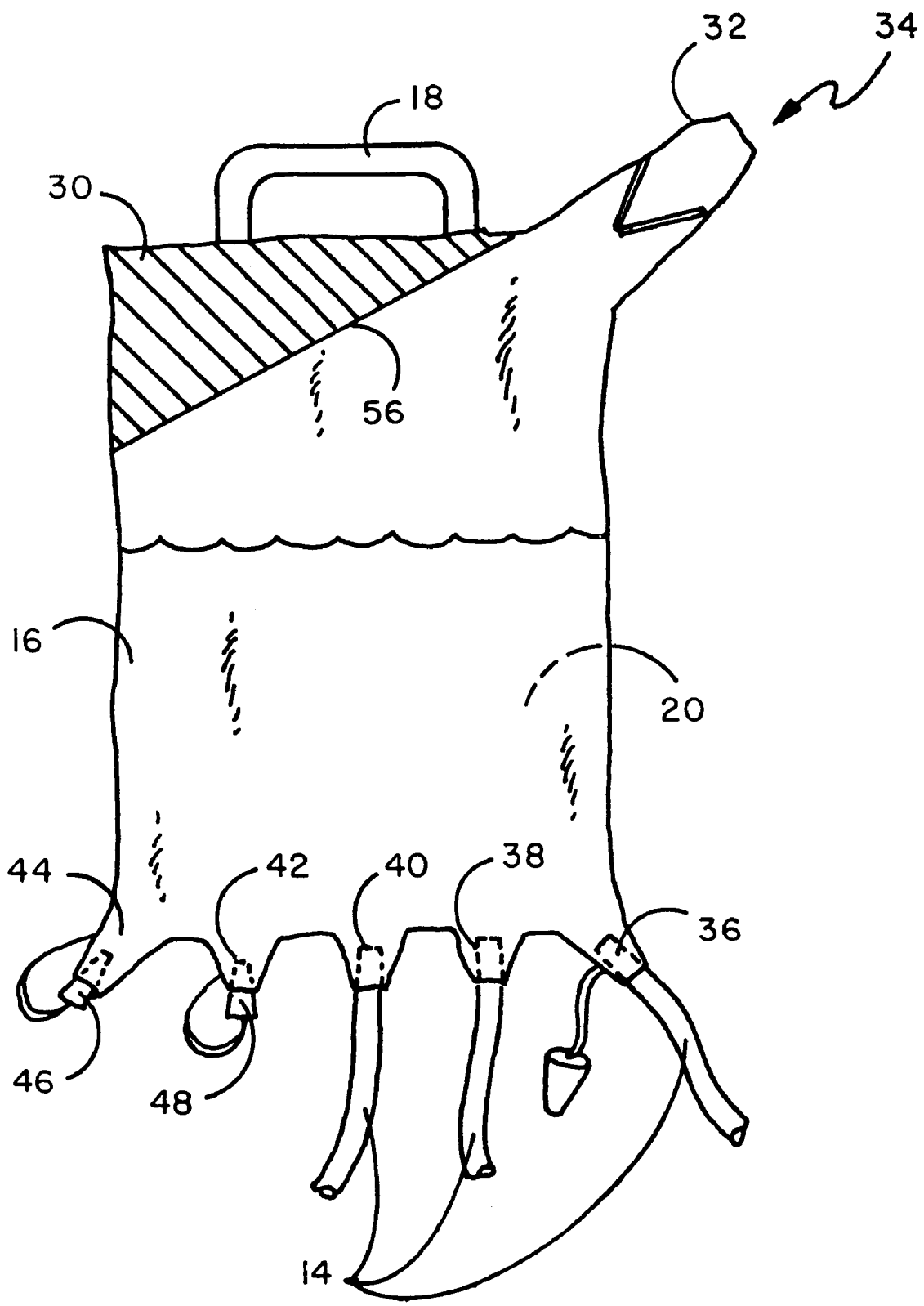
FIG. 4 illustrates a front view of the reservoir of the apparatus of this invention.

FIG. 1 shows the wine filling apparatus of this invention attached to a completely full wine barrel. Wooden barrel 12 has a tap 28 for dispensing wine and is supported by barrel supports 26. The apparatus of this invention includes an airtight wine reservoir 16 suspended from reservoir support means 18, with tube 14 extending from the bottom of reservoir 16. Tube 14 runs from reservoir 16 into barrel 12 through bung 10 in bunghole 24, as shown in an enlarged view in FIG. 3. The engagement of tube 14 in bung 10 will be discussed in further detail below.

Reservoir 16 contains a supply of wine 20 of the same type contained within barrel 12. In a preferred embodiment wine reservoir 16 can be a flexible bag initially full of wine made of silicone rubber approved by the FDA for use in wine making (such as methylvinylpolysiloxane elastomers) and should be of a dark color to block out the harmful effects of light. The bag can be translucent enough to determine visually whether the bag is getting empty and should be refilled. One can also determine by feeling the bag whether the bag should have more wine added to it. As barrel 12 loses wine through cracks, seepage or evaporation, gravity causes the wine in reservoir 16 to flow through tube 14 into the barrel through, in one embodiment as seen in FIG. 3, an aperture 27 in bung 10 to maintain the barrel's full status. Other means of positioning the tube inside the barrel can also be utilized. As seen in FIG. 2, a single reservoir 16 can be connected through use of one or more tubes 14 to supply, respectively, one or more barrels 12. The force of gravity causes the wine to travel through tubes 14 to replace wine lost from barrels 12. By immediate replacement of escaped wine, the apparatus of this invention helps prevent the formation of air pockets in the barrels and thus prevents oxidation and spoilage of the wine aging therein.

FIG. 3 is an enlarged, cross-sectional view of bung 10 in bunghole 24. Barrel 12 has at its top portion bunghole 24 into which bung 10 is releasably mounted. Tube 14 passes through an aperture 27 defined in bung 10 and passes inside barrel 12. Since the outer diameter of tube 14 is substantially the same as the diameter of aperture 27, tube 14 is in an airtight relationship with bung 10 which, in turn, forms an airtight seal with the barrel. Bung 10 can be any conventional bung made of plastic normally used with wine aging barrels which then can have an aperture formed therein into which tube 14 can be positioned.

FIG. 4 illustrates an enlarged view of reservoir 16, showing support means 18 which can be a handle suspended, for example, from a hook as seen in FIG. 1. Spout 34 can be disposed extending from the top of reservoir 16 at an upward angle forming line 56 where the portion of the reservoir bag above line 56 is bonded together to form a solid portion 30. Spout 34 can contain squeeze gate valve 32 which, when squeezed, allows wine to be poured in through spout 34 and, when released, forms an airtight seal. At the bottom of reservoir 16 are shown five outlets: first outlet 36, second outlet 38, third outlet 40, fourth outlet 42 and fifth outlet 44.

More outlets or fewer outlets can be provided at the bottom of reservoir 16. Not all the outlets provided need to be used at the same time. In the embodiment illustrated in FIG. 4, only first outlet 36, second outlet 38 and third outlet 40 are utilized, each having a tube 14 extending to a different barrel, not shown, and attached thereto. Fourth outlet 42 and fifth outlet 44 each have their associated plug members 48 and 46, attached, respectively, thereto and inserted therein as shown. The other outlets also have associated plug members for use when no tubes are inserted therein.

The apparatus of this invention can be easily retrofitted to any type of barrel by positioning the tube of this invention through an aperture formed in the bung and then placing the bung in the bunghole of a given barrel.

Although the present invention has been described with reference to particular embodiments, it will be apparent to those skilled in the art that variations and modifications can be substituted therefor without departing from the principles and spirit of the invention.

We claim:

1. A method for preventing oxidation of wine aging inside a barrel, comprising the steps of:

providing a barrel having a bunghole defined in said barrel;

providing a bung having an aperture defined therethrough, said bung disposed within said bunghole;

suspending a flexible bag wine reservoir above said barrel;

providing at least one tube connecting said flexible bag wine reservoir to said inside of said barrel;

allowing wine to pass from said flexible bag wine reservoir, down said tube, through said aperture in said bung to said inside of said barrel by force of gravity as said wine escapes from said barrel; and maintaining a full barrel of said wine by said passage of said wine from said flexible bag wine reservoir to said inside of said barrel.

2. A method for preventing oxidation of wine aging within a plurality of barrels including the steps of:

providing a bunghole defined in each of said plurality of barrels; and providing a like number of bungs as said plurality of barrels, each of said bungs having an aperture defined therethrough, each of said bungs disposable within one of said bungholes; and providing a like number of tubes as said plurality of barrels, said tubes connecting a flexible bag wine reservoir to the inside of each of said plurality of barrels; and allowing wine to pass from said flexible bag wine reservoir, down said number of tubes, through said apertures in each of said bungs to the inside of each of said plurality of barrels by force of gravity as said wine escapes from said plurality of barrels; and maintaining full barrels of said wine by said passage of said wine from said flexible bag wine reservoir to said inside of each of said plurality of barrels.

\* \* \* \* \*